United States Patent
Amon et al.

(10) Patent No.: US 11,548,243 B2
(45) Date of Patent: Jan. 10, 2023

(54) METHOD FOR PRODUCING A FIBER-REINFORCED STRUCTURAL HOLLOW COMPONENT

(71) Applicant: KTM Technologies GmbH, Salzburg/Anif (AT)

(72) Inventors: Thassilo Amon, Deggendorf (DE); Hans Lochner, Ramsau (DE)

(73) Assignee: KTM TECHNOLOGIES GMBH, Salzburg/Anif (AT)

( * ) Notice: Subject to any disclaimer, the term of this patent is extended or adjusted under 35 U.S.C. 154(b) by 293 days.

(21) Appl. No.: 16/081,636

(22) PCT Filed: Mar. 1, 2017

(86) PCT No.: PCT/EP2017/054740
§ 371 (c)(1),
(2) Date: Aug. 31, 2018

(87) PCT Pub. No.: WO2017/148998
PCT Pub. Date: Sep. 8, 2017

(65) Prior Publication Data
US 2019/0061287 A1 Feb. 28, 2019

(30) Foreign Application Priority Data
Mar. 4, 2016 (DE) ...................... 10 2016 103 979.9

(51) Int. Cl.
*B29C 70/48* (2006.01)
*B29C 33/52* (2006.01)
(Continued)

(52) U.S. Cl.
CPC .......... *B29C 70/48* (2013.01); *B29C 33/3842* (2013.01); *B29C 33/52* (2013.01);
(Continued)

(58) Field of Classification Search
CPC ....................................................... B29C 70/48
See application file for complete search history.

(56) References Cited

U.S. PATENT DOCUMENTS

| 4,248,817 A | 2/1981 | Frank |
| 5,132,069 A | 7/1992 | Newton |

(Continued)

FOREIGN PATENT DOCUMENTS

| DE | 10 2004 009 744 A1 | 9/2005 |
| DE | 10 2007 026 453 A1 | 12/2008 |

(Continued)

OTHER PUBLICATIONS

German Search Report for German Application No. DE10 2016 103 979.9, dated Oct. 25, 2016.
(Continued)

*Primary Examiner* — Benjamin A Schiffman
(74) *Attorney, Agent, or Firm* — JK Intellectual Property Law, PA

(57) ABSTRACT

A method for manufacturing a fiber-reinforced hollow structural component includes introducing a mold core and fibers with a matrix material into a molding tool. A first fiber unit is located between the mold core and the molding tool to at least partially form a component wall. The matrix material is cured to form the hollow structural component and the mold core is flushed out of the hollow structural component to form a component cavity. At least one channel may extend through the mold core so that after the matrix material has cured and the mold core has been flushed out, a reinforcing strut is formed. A related hollow structural component is also disclosed.

16 Claims, 4 Drawing Sheets

(51) Int. Cl.
*B29C 64/165* (2017.01)
*B29C 53/82* (2006.01)
*B29C 33/38* (2006.01)
*B29C 33/42* (2006.01)

(52) U.S. Cl.
CPC ............ *B29C 53/82* (2013.01); *B29C 64/165* (2017.08); *B29C 2033/422* (2013.01)

(56) References Cited

U.S. PATENT DOCUMENTS

| | | | |
|---|---|---|---|
| 5,204,055 A * | 4/1993 | Sachs | B28B 1/001 |
| | | | 419/2 |
| 5,784,926 A | 7/1998 | Maass | |
| 6,264,868 B1 | 7/2001 | Marchant | |
| 2003/0144062 A1 | 7/2003 | Holemans et al. | |
| 2008/0145592 A1 | 6/2008 | Johnson | |
| 2011/0168324 A1 | 7/2011 | Ender | |
| 2012/0090770 A1 * | 4/2012 | Cavaliere | B29C 70/30 |
| | | | 156/172 |
| 2014/0326738 A1 | 11/2014 | Knoop | |
| 2015/0320956 A1 | 11/2015 | Dunne | |

FOREIGN PATENT DOCUMENTS

| | | | | |
|---|---|---|---|---|
| DE | 102013106876 A1 * | 1/2015 | ............... | B32B 3/04 |
| DE | 10 2013 019 470 A1 | 5/2015 | | |
| DE | 10 2013 226 017 A1 | 6/2015 | | |
| GB | 2146572 A | 4/1985 | | |
| JP | S50-145474 A | 11/1975 | | |
| JP | S52-107069 | 9/1977 | | |
| JP | S 61-31218 A | 2/1986 | | |
| JP | H11-77701 A | 3/1999 | | |
| JP | 2002-001788 A | 1/2002 | | |
| JP | 2004-249654 A | 9/2004 | | |
| WO | WO 2013/126981 A1 | 9/2013 | | |

OTHER PUBLICATIONS

English Translation of International Search Report for PCT/EP2017/054740, dated Sep. 4, 2018.
Japanese Office Action for Application No. 2018-565460, dated Feb. 9, 2021 with English Translation.
Japanese Office Action dated Jun. 8, 2021 with English Translation.

* cited by examiner

METHOD FOR PRODUCING A FIBER-REINFORCED STRUCTURAL HOLLOW COMPONENT

CROSS-REFERENCE TO RELATED APPLICATIONS

This application is a national stage of International Application No. PCT/EP2017/054740, filed Mar. 1, 2017, and claims benefit to German Application No. 10 2016 103 979.9, filed Mar. 4, 2016, both of which are incorporated by reference herein.

TECHNICAL FIELD

The present invention relates to a method for producing a fiber-reinforced structural hollow component, in which a mold core is manufactured, the mold core and fibers with a matrix material are introduced into a molding tool, so that a first fiber unit with the matrix material is located between the mold core and the molding tool in order to at least partially form a component wall, the matrix material is cured as a result of a change in temperature and/or pressure in order to form the hollow structural component and, after the curing, the mold core is flushed out of the hollow structural component in order to form a component cavity. Moreover, the invention relates to a mold core for use in a manufacturing method of this type. Moreover, the present invention relates to a hollow structural component made from a fiber composite material comprising a component wall, a component cavity formed in the interior of the component wall, and at least one reinforcing element extending through a component cavity, in particular a reinforcing strut.

BACKGROUND

Fiber-reinforced components comprise reinforcing fibers, in particular carbon fibers, glass fibers, and/or aramid fibers, which are embedded or incorporated in a, in particular, thermoplastic and/or duroplastic matrix. The reinforcing fibers, in particular, give the component the necessary strength and stiffness. The matrix, however, has the primary effect of holding the reinforcing fibers in a desired shape. The reinforcing fibers are therefore aligned, supported, and protected by the matrix.

DE 10 2007 026 453 A1 describes a hollow component comprising a fiber-reinforced stiffening strut. For each stiffening strut in this case, cylinder segment-shaped cores are wrapped with fiber material and are subsequently positioned with respect to each other with the aid of a positioning aid. In order to form an outer contour, a mold core is filament-wound with reinforcing fibers. The described method is extremely complex and requires numerous individual work steps to form the reinforcing struts.

SUMMARY

The problem addressed by the present invention is therefore that of providing a method for manufacturing a fiber-reinforced hollow structural component as well as a fiber-reinforced hollow structural component, with the aid of which the aforementioned disadvantages may be eliminated.

The problem is solved by a method for manufacturing a fiber-reinforced hollow structural component, a mold core, a method for utilizing the mold core, and a hollow structural component having the features of the following disclosure.

The invention relates to a method for manufacturing a fiber-reinforced hollow structural component, in which a mold core is manufactured. The mold core and fibers are introduced into a molding tool along with a matrix material. As a result, a first fiber unit with the matrix material is located between the mold core and the molding tool. The fibers can be made available in the form of short-cut fibers, short-cut threads, continuous fibers, strips, fabric mats, laid structures, and/or prepregs. The term "prepreg" refers to strips, fabric mats, or cloth inlays, which have been pre-impregnated with a resin, preferably a duroplastic matrix material, and, possibly, have been pre-cured. The matrix material is preferably an epoxy resin or polyurethane resin, in particular, a single-, two-, or three-component resin. A component wall of the hollow structural component is at least partially formed from the first fiber unit and the matrix material.

The duroplastic and/or thermoplastic matrix material, which is initially present in a viscous state, is cured as a result of a change in temperature and/or pressure in order to form the hollow structural component. For this purpose, the molding tool is closed and is acted upon by pressure or temperature. The mold core is a soluble core in this case. Moreover, the mold core expands, preferably due to the change in the ambient conditions, and so at least the first fiber unit, together with the matrix material, is pressed against the molding tool. After the matrix material has cured, the mold core is flushed out of the hollow structural component in order to form a component cavity.

According to the invention, at least one channel extending through the mold core is formed in the mold core. The channel is primarily formed together with the mold core during the manufacture of the mold core. In this case, the channel is formed in the mold core during the manufacture of a main body of the mold core. During the primary forming, a workpiece, specifically the mold core including its channel in this case, is created from a shapeless substance. The objective in this case is to create a material cohesion and to thereby produce an initial shape of a geometrically solid body. The mold core is preferably present as a single piece, and so the method can be designed to be as simple as possible and to include only a few work steps. At least one second fiber unit, which can be designed, for example, as woven fabric, a laid structure, and/or tubes of this type, is introduced into the channel. Additionally or alternatively, this second fiber unit can also be designed as short-cut fibers, short-cut threads, or continuous threads. The second fiber unit can be a fiber which has already been impregnated or which has not been impregnated. In addition to the second fiber unit, the matrix material is introduced into the channel. Alternatively, it is also conceivable, however, to merely inject the matrix material into the channel without having previously introduced a second fiber unit into the channel. In this case, a reinforcing element, in particular the reinforcing strut, is formed exclusively of the matrix material.

The second fiber unit and/or the matrix material are/is introduced into the channel in such a way that, after the matrix material has cured and after the mold core has been flushed out, the reinforcing element, in particular the reinforcing strut, is formed in the hollow structural component. The reinforcing element, in particular the reinforcing strut, extends through the component cavity. In addition, the reinforcing element is connected, in the area of its two ends, to the component wall, in particular in a form-locking and/or integrally joined manner. The manufacturing method of the hollow structural component can therefore be implemented easily and in a time-saving manner. The manufacturing method can be designed to be highly time-saving and, therefore, cost-effective, in particular due to the fact that the mold core is manufactured together with its at least one channel in one method step. The reinforcing element, in particular the reinforcing strut, due to its connection to the component wall of the hollow structural component, is a measure for ensuring stability, even under extreme conditions, and so quality is permanently ensured. Moreover, due to the present method, a very lightweight, fiber-reinforced hollow structural component can be formed, since the core does not remain in the cavity of the hollow structural component, but rather is removed.

It is advantageous when the at least one channel and/or a supply channel—which is provided for rapidly conducting a solvent into the interior of the mold core—are/is primarily formed together with the mold core in a rapid prototyping method, in particular a 3D printing method, or the mold core is primarily formed together with its at least one channel and/or the supply channel in a rapid prototyping method. As a result, highly complex channel shapes, in particular comprising at least one undercut, preferably comprising at least two undercuts, or a curved freeform geometry, can also be formed. Moreover, the mold core can be manufactured together with its channel very rapidly and cost-effectively. In addition, the location at which the mold core is manufactured is not fixed. For example, mold core geometries can be virtually sent to customers who then can print out the mold core geometries on-site using their own 3D printer.

It is advantageous when the reinforcing element is at least one reinforcing wall (in particular completely closed, so that preferably two chambers are formed, which are separated from each other), a reinforcing strut, a truss, and/or a reinforcing structure. Moreover, it is advantageous when the reinforcing element is designed to be hollow. The reinforcing element can also be designed to be straight and/or curved, at least in some areas. The reinforcing element can have an "X" shape and/or a "Y" shape.

It is also an advantage when the first fiber unit is wrapped around the mold core. The first fiber unit is preferably formed from a pre-impregnated continuous fiber in this case. The first fiber unit can also be laid around the mold core as a prepreg. In this case, it is initially irrelevant whether the fibers are already impregnated with matrix material, or not. The wrapped mold core is introduced into the molding tool for shaping. Alternatively, it is conceivable to initially place the prepreg into the molding tool in order to form the first fiber unit and to subsequently introduce the mold core. In order to fix the fibers in the hollow structural component to be formed, it is alternatively or additionally advantageous when the matrix material is injected into the molding tool after the molding tool is closed. As a result, the fibers of the first and of the second fiber units are impregnated with matrix material, and so the fibers, after having cured, are held in position and can transmit and distribute tensions occurring in the component wall and in the reinforcing strut.

The matrix material is advantageously injected into the channel from the side of the mold core facing the molding tool. For this purpose, the mold core comprises at least one channel opening, via which the matrix material is conducted through the first fiber unit into the channel. Moreover, it is conceivable that pressure is applied to the matrix material in such a way that the matrix material is pressed through the first fiber unit, so that the matrix material enters the channel intended therefor. The second fiber unit is preferably situated in the channel, so that the second fiber unit is impregnated with the pressed-in matrix material. It is also conceivable, however, that the reinforcing strut is formed only by the matrix material. Additionally or alternatively, the matrix material is injected into the channel through the supply channel which is preferably connected to the channel in the area between its two channel openings. The supply channel extends at least from the area of the molding tool, from which the matrix material is injected, up to the channel. As a result, the matrix material can be conducted to the channel in a targeted manner. Since the surface of the mold core, which is directly accessible for the solvent, is considerably enlarged due to the supply channel, the flushing-out of the mold core is facilitated.

The channel is advantageously formed before the first fiber unit is situated on the mold core.

Moreover, it is advantageous when the channel is designed to be straight, to have a sharp bend, and/or to be curved. Additionally or alternatively, it is advantageous when the channel is designed to include at least two undercuts which are spaced apart from each other in the longitudinal extension or longitudinal direction of the channel. The channel can also have a freeform geometry. The channel can also be composed of multiple protruding sections which are identical and/or which differ from each other. As a result, the subsequent shape of the reinforcing strut can be individually adapted to the required stiffness.

It is advantageous, during the primary forming, in particular the rapid prototyping, when a first longitudinal half of the channel is initially formed in a first mold core part and the other longitudinal section half is formed in a second mold core part. These two mold core parts are subsequently connected to each other, so that the finished channel, which is open only at its two ends, is formed. The shape of the channel or the reinforcing strut can therefore be easily adapted to highly diverse conditions.

The fibers of the second fiber unit are introduced into the channel with the aid of an, in particular, mechanical and/or pneumatic introduction device. In this case, the mechanical introduction device is an, in particular, flexible needle, for example. The fibers of the second fiber unit are introduced into the mold core, for example, with the aid of the needle, so that the fibers extend from the first channel opening up to the second channel opening. The first channel opening, in this case, is a fiber inlet opening and the second channel opening is a fiber outlet opening, wherein this arrangement can also be reversed. It would also be possible to sew the fibers through the two channel openings into the channel, so that the two channel openings are fiber inlet openings and fiber outlet openings.

Alternatively or additionally, it is advantageous when the fibers of the second fiber unit are introduced into the channel with the aid of an air flow. The fiber introduction would therefore take place with the aid of a pneumatic introduction device, in particular a nozzle. The channel was primarily formed, in this case, together with the core or during the manufacture of the core, before the fibers were injected, wherein any conceivable channel shape is possible, in principle. The fibers can be injected through one of the two channel openings, so that the fibers emerge from the other channel opening and, therefore, extend completely through the channel. The channel includes no further openings between its two end openings in this case. The injection of the fibers makes it possible to design the channel in various ways, since the introduction of the fibers can take place independently of the shape of the channel. In order to also guide the fibers through a sharply bent channel, it is sufficient, for example, to increase the flow speed of the air flow.

The two channel openings can be formed only on the mold core itself in this case. It is also conceivable that the first fiber unit comprises the two channel openings. The placement of the channel openings can vary depending on the manufacturing method and the point in time of the wrapping of the mold core with the first fiber unit. If a fiber mat is placed into the molding tool, for example, it makes sense to form the channel and the second fiber unit before the placement into the molding tool. Consequently, only the mold core would comprise the channel openings, but the first fiber unit would not. However, if the first fiber unit is placed around the mold core first and the second fiber unit is subsequently introduced into the channel, the first fiber unit also comprises at least one of the two channel openings, since the first fiber unit must be penetrated by the second fiber unit.

In addition, it is advantageous when the second fiber unit is connected to the particular assigned area of the first fiber unit, in particular in an integrally joined and/or form-locking manner. In this case, the second fiber unit is preferably connected, at its two ends, to the first fiber unit while forming two connection areas. The fibers of the second fiber unit are joined, in particular, sewn, to the first fiber unit in this case. The two fiber units can be fixedly connected to each other in this way, and so a particularly high level of stability is ensured. In addition, the forces occurring at the connection point can be effectively transmitted without losses.

Advantageously, at least one of the two connection areas is formed on an outer side of the first fiber unit. In this case, a slot or an opening is preferably cut into the first fiber unit. The second fiber unit is subsequently guided through this opening. The second fiber unit can be introduced with the aid of the pneumatic as well as the mechanical introduction device. In one embodiment, the second fiber unit is pierced through the first fiber unit lying around the mold core with the aid of the mechanical introduction device, in particular the needle, in particular when neither a slot nor an opening has been cut in the first fiber unit. Alternatively, the fibers of the second fiber unit can be introduced with the aid of the air flow or the nozzle, in particular when the channel extends from the outer side of the first fiber unit through the mold core up to the opposite other outer side of the first fiber unit.

It is advantageous when the particular overhanging end of the second fiber unit is folded onto the outer side of the first fiber unit in the area of the two channel openings. The injected and cured matrix material is possibly already sufficient for permanently connecting the second fiber unit to the outer side of the first fiber unit. In addition, it is also conceivable to sew or interlace the overhanging ends together with the outer side of the first fiber unit. As a result, the loads can be effectively conducted into the component, and so the stability of the component is positively influenced.

At least one of the two connection areas is advantageously formed on an inner side of the first fiber unit. For this purpose, the second fiber unit is initially introduced into the channel and its overhanging ends are then folded onto a circumference of the mold core. The mold core is subsequently wrapped with the first fiber unit. In order to form secure connection points, these two fiber units can be additionally sewn to each other.

It is also advantageous when at least one of the two connection areas is formed in the interior of the first fiber unit. In this case, one fiber layer of the first fiber unit is preferably situated around the mold core, in particular several times, one after the other. In order to form the fiber layer, the first fiber unit can be wrapped around the mold core several times or can also be placed around the mold core in the form of a fiber mat. In the meantime or subsequently, the fiber layer is penetrated, in particular pierced, by a portion of the fibers of the second fiber unit or, when a slot or an opening has been formed, a portion of the fibers of the second fiber unit is passed through the fiber layer. The overhanging end of this portion is folded onto the outer side of the first fiber layer and/or is sewn thereto. Subsequently, one further second fiber layer is laid or wrapped around the existing mold core including the first fiber layer, so that the ends of the second fiber unit are covered. The manufacturing method can be simply designed in this way, without negatively influencing the stability of the connection areas between the fiber units.

It is also advantageous when the supply channel of the mold core is filled with a filling material, in particular with an expansion material such as wax, before the injection of the matrix material. During the injection of the matrix material into the molding tool, the matrix material is pressed through the first fiber unit into the channel of the mold core, and so the second fiber unit is also impregnated with the matrix material. Due to the supply channel filled with filling material, it is ensured that only the channel is filled with the matrix material. The supply channel, which is ultimately utilized for flushing out the mold core in an improved way, is therefore kept free. After the matrix material has cured, the filling material is flushed out together with the mold core, and so the mold core can be ideally removed from the hollow structural component with the aid of the solvent.

The mold core advantageously expands when the temperature increases. As a result, a mold core cross-section increases, and so the first fiber unit embedded in the matrix material is pressed outward against a negative mold of the molding tool. All air bubbles located in the fiber units and in the matrix material can be efficiently removed from the component in this way, and so the quality of the component is ensured.

Moreover, it is advantageous when the solvent is flushed into the supply channel of the mold core after the matrix material has cured, so that the mold core detaches from the hollow structural component. Alternatively or additionally, it is advantageous when the solvent is flushed onto a cross-section of the mold core. The mold core, which is, for example, a sand core or a salt core, can be reliably flushed out of the hollow structural component with nearly no residue, in particular through the supply channel.

The invention further relates to a mold core for and/or for use in a method for manufacturing a fiber-reinforced hollow structural component according to the preceding description, wherein the aforementioned features can be present individually or in any combination. After the hollow structural component has cured, the mold core can be flushed out of the hollow structural component in order to form a component cavity. At least one channel extending through the mold core is formed in the mold core; the channel is primarily formed together with the mold core during the manufacture of the mold core, in particular in a rapid prototyping method.

It is advantageous when the mold core is designed according to the preceding description, wherein the aforementioned device features can be present individually or in any combination.

The invention further relates to the use of a mold core according to the preceding description in a method for manufacturing a fiber-reinforced hollow structural component according to the preceding description, wherein the aforementioned features can be present individually or in any combination.

The invention also relates to a hollow structural component made from a fiber composite material and comprising a component wall. A component cavity is formed in the interior of the component wall. At least one reinforcing element, in particular a reinforcing strut, extends through this component cavity. According to the invention, the hollow structural component is designed according to the preceding description, wherein the aforementioned features can be present individually or in any combination. The hollow structural component is designed to be extremely stable since the reinforcing element, in particular the reinforcing strut, extends across the entire component cavity and, therefore, has a supporting effect. In addition, the loads occurring in the component can be efficiently conducted, and so the component can also reliably withstand high loadings.

Moreover, it is advantageous when the reinforcing element, in particular the reinforcing strut, is connected at its ends in an integrally joined and/or form-locking manner, in particular being sewn, to the component wall in a particular connection area. As a result, the reinforcing strut is prevented from being torn out due to high loads in a structurally simple way.

BRIEF DESCRIPTION OF THE DRAWINGS

Further advantages of the invention are described in the following exemplary embodiments. Wherein:

FIG. 9a shows a sectional view of a structural component comprising a reinforcing element, in particular a reinforcing strut, and FIG. 9b shows a sectional view of a structural component according to FIG. 9a.

DETAILED DESCRIPTION

Figure 1:
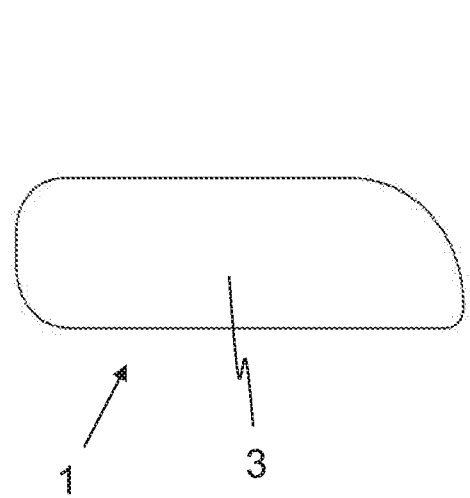
FIG. 1 shows a front view of a mold core.

FIG. 1 shows a front view of a mold core 1. The mold core 1 is provided for manufacturing a non-represented hollow structural component 2 (cf. FIGS. 9a, 9b). The mold core 1 is preferably formed from granules, in particular sand, which are held together via a binding agent, in particular an adhesive. In addition, the mold core 1 expands preferably as a result of a temperature increase, and so its volume 3 increases.

In the following description of the alternative exemplary embodiments of the mold core 1 represented in FIGS. 2 to 3c, identical reference numerals are utilized for features which are identical and/or at least comparable in terms of their design and/or mode of operation as compared to the first exemplary embodiment represented in FIG. 1. If these features are not explained again in detail, their design and/or mode of operation correspond to the design and mode of operation of the features already described above.

Figure 2:
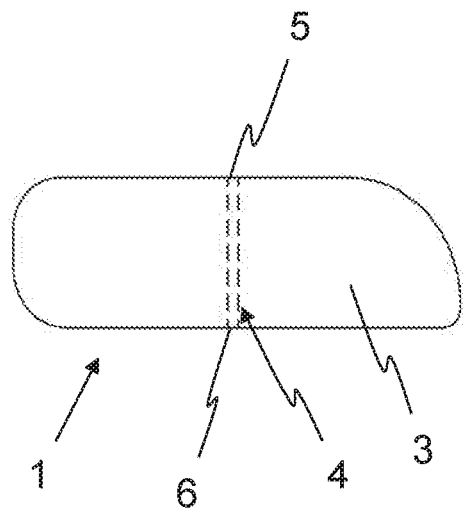
FIG. 2 shows a front view of a second exemplary embodiment of a mold core comprising a channel.
Figure 3A:
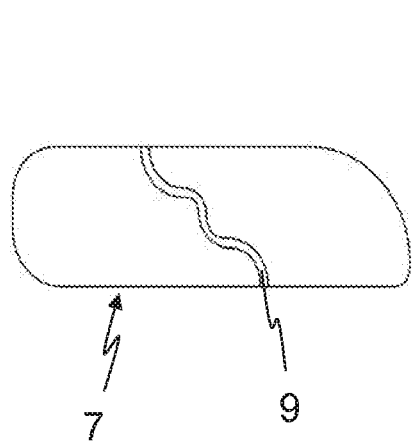
FIG. 3a shows a front view of one longitudinal section half of a third exemplary embodiment of a mold core comprising a channel.
Figure 3B:
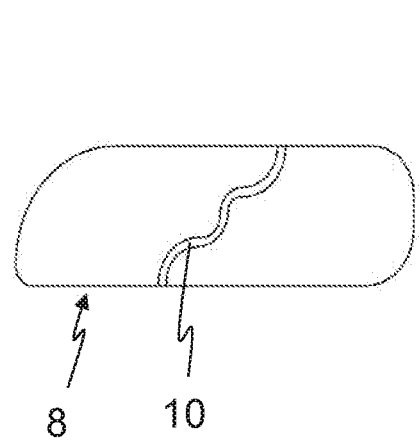
FIG. 3b shows a front view of a second longitudinal section half of the third exemplary embodiment.
Figure 3C:
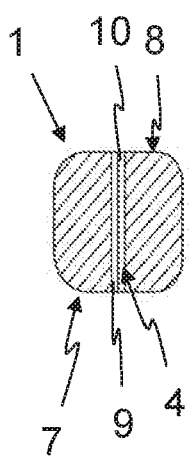
FIG. 3c shows a sectional view of a mold core according to the third exemplary embodiment.

FIG. 2 shows a second exemplary embodiment of the mold core 1 which is preferably designed as a single piece in this case. The mold core 1 comprises a channel 4 including a first channel opening 5 and a second channel opening 6. The channel 4 is preferably primarily formed together with the mold core 1 in a rapid prototyping method, in particular a 3D printing method. Moreover, the channel 4 extends through the entire mold core 1 or, according to the figure, across its entire height. The channel 4 is designed to be straight in the present case. In one exemplary embodiment which is not represented here, the channel 4 can be additionally or alternatively sharply bent and/or, as represented in FIGS. 3a and 3b, curved. Additionally or alternatively, it is advantageous when the channel 4 is designed to include at least two undercuts which are spaced apart from each other in the longitudinal extension or longitudinal direction (cf. FIGS. 3a and 3b). The channel 4 can also have a freeform geometry. The channel 4 can also be composed of multiple protruding sections which are identical and/or which differ from each other.

FIGS. 3a and 3b each show one half of a multiple-part mold core 1 comprising a primarily formed channel 4 which has been manufactured, in particular, in a rapid prototyping method. FIG. 3c shows a cross-sectional view of this mold core which has been assembled. The mold core 1 comprises a first mold core part 7 and a second mold core part 8. In order to form the channel 4, a first longitudinal section half 9 is primarily formed in the first mold core part 7 and a second longitudinal section half 10 is primarily formed in the second mold core part 8. The two longitudinal section halves 9, 10 correspond to each other, so that, when assembled, they form the channel 4. The two mold core parts 7, 8 are connected to each other, in particular being glued, for this purpose. Alternatively, the mold core 1 can also be designed as a single piece.

Figure 4:
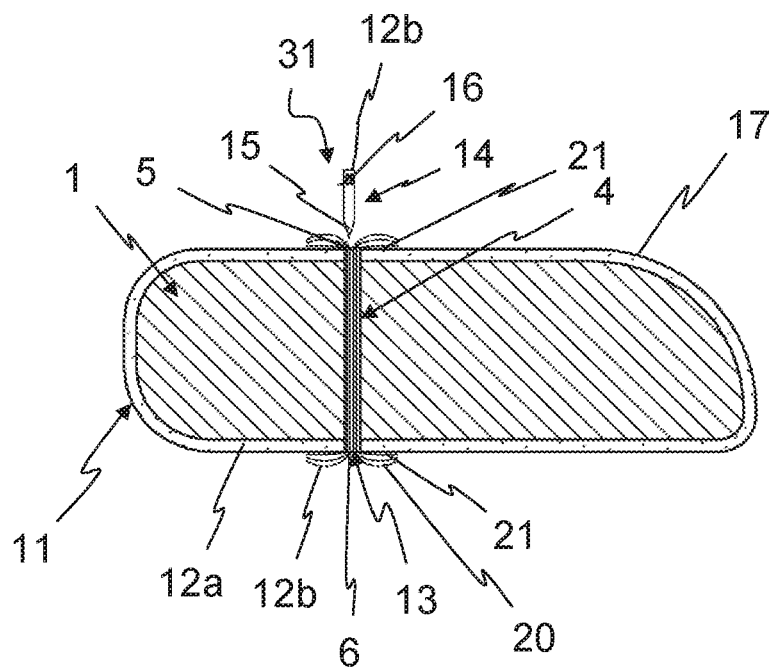
FIG. 4 shows a sectional view of a mold core wrapped with fibers.

FIG. 4 shows a mold core 1 which is wrapped with a first fiber unit 11. The first fiber unit 11 is formed from a multitude of fibers 12a and can comprise several fiber layers lying one on top of the other. In this case, it is irrelevant whether the fibers 12a are staple fibers, continuous fibers, or the like. It is also conceivable that the first fiber unit 11 is formed by at least one fiber mat. In addition, the mold core 1 comprises a second fiber unit 13. The second fiber unit is formed by fibers 12b.

The fibers 12b are guided through the channel 4 and/or the first fiber unit 11 with the aid of an, in particular mechanical and/or pneumatic, introduction device 31, in particular with the aid of a nozzle (not represented) or a needle 14. The at least one fiber 12b is guided through the mold core 1, in particular its channel 4, with the aid of the introduction device 31, and remains at least partially therein. The second fiber unit 13 is formed by way of the introduction of multiple fibers 12b. The second fiber unit 13 is guided, in particular pierced, through the first fiber unit 11 and the mold core 1. The two channel openings 5, 6 are formed on an outer side 17 of the first fiber unit 11.

The channel 4 is formed before the wrapping of the mold core 1 together therewith, by way of a primary forming method, in particular a rapid prototyping method.

In order to guide or pierce the second fiber unit 13 through the first fiber unit 11, a slot (not shown) and/or an opening can be introduced, in particular cut, into the first fiber unit 11. The overhanging ends 20 of the fibers 12b of the second fiber unit 13 are folded onto the outer side 17 of the first fiber unit 11, so that the ends 20 can be connected to the first fiber unit 11 while forming a connection area 21 in each case.

In addition, the fiber layer of the first fiber unit 11 can be wrapped, on its outer side, with a second layer (not shown here), so that the ends 20 are embedded between these two fiber layers.

The channel 4 is primarily formed together with the mold core 1 before the introduction of the fibers 12b. The fibers 12b of the second fiber unit 13 can then be brought into the channel 4, in particular being drawn through or injected, with the aid of the introduction device 31, in particular with the aid of the needle 14 or an air flow. According to FIG. 4, the needle comprises, at its one end, a tip 15 for easy introduction and, at its other end, an eye 16 for accommodating at least one part of the second fiber unit 13.

Figure 5:
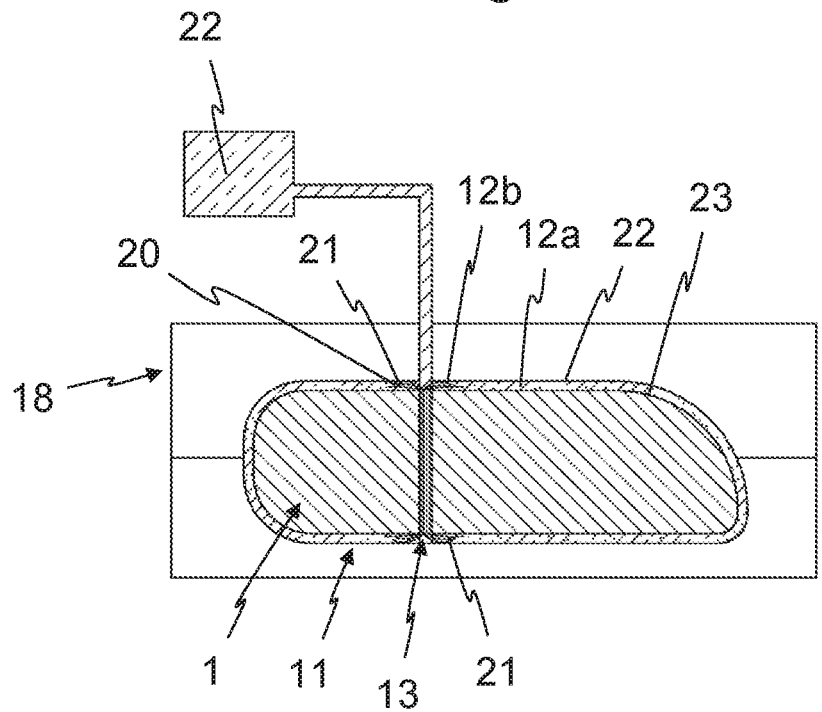
FIG. 5 shows a diagrammatic sectional view of a molding tool comprising a mold core.

FIG. 5 shows a molding tool 18, in which the mold core 1 is situated together with the two fiber units 11, 13. In the represented exemplary embodiment, the fibers 12a of the first fiber unit 11 were wrapped around the mold core 1 or introduced into its channel 4 in alternation with the fibers 12b of the second fiber unit 13 before the mold core 1 was introduced into the molding tool 18. As a result, the connection areas 21 are formed in the interior of the first fiber unit 11.

Matrix material 22 is injected into the molding tool 18 in order to fix the fibers 12a, 12b of the two fiber units 11, 13. The matrix material 22 is pressed through the first fiber unit 11 into the channel 4 comprising the second fiber unit 13. The two fiber units 11, 13 are embedded into the matrix material 22 as a result. After the injection of the matrix material 22, the matrix material 22 is cured as a result of a change in pressure and/or temperature. In this case, the mold core 1 expands in such a way that at least the first fiber unit 11 with the matrix material 22 is pressed against a negative mold 23 of the molding tool 18. As a result, the two fiber units 11, 13 impregnated with the matrix material 22 also retain their predefined shape after the curing of the matrix material 22.

In the following description of the alternative exemplary embodiments of the molding tool 18 represented in FIGS. 6 and 7, identical reference signs are utilized for features which are identical and/or at least comparable in terms of their design and/or mode of operation as compared to the first exemplary embodiment represented in FIG. 5. If these features are not explained again in detail, their design and/or mode of operation correspond to the design and mode of operation of the features already described above.

Figure 6:
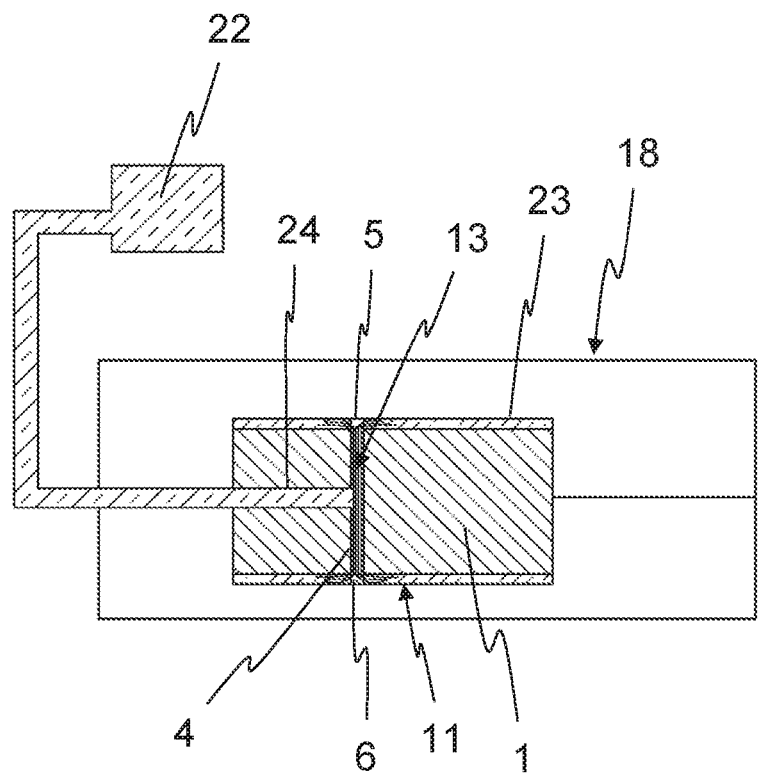
FIG. 6 shows a diagrammatic sectional view of a second exemplary embodiment of a molding tool comprising a mold core.

FIG. 6 shows the molding tool 18 comprising a supply channel 24. The supply channel 24 can be primarily formed together with the at least one channel 4 and the mold core 1, in particular in a rapid prototyping method. The supply channel 24 is connected to the channel 4 in the area between the two channel openings 5, 6. The matrix material 22 is injected into the channel via the supply channel 24, preferably in such a way that the first fiber unit 11 is also impregnated with the matrix material 22. After the matrix material 22 has cured, it is possible to flush out the mold core 1 via the supply channel 24. The combination of the embodiment of the molding tool described in FIGS. 5 and 6 is conceivable.

Figure 7:
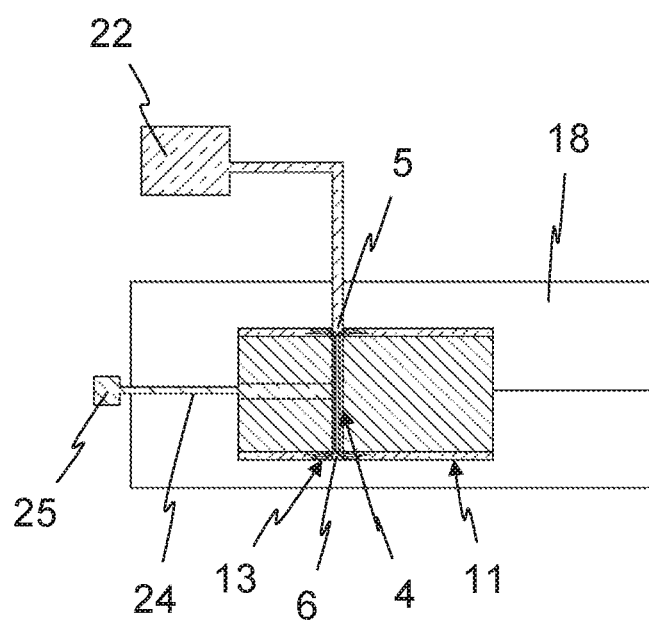
FIG. 7 shows a sectional view of one further exemplary embodiment of a molding tool comprising a mold core.

FIG. 7 shows the molding tool 18 comprising the supply channel 24. In contrast to FIG. 6, a filling material 25 is filled into the supply channel 24 in this case. The filling material 25 is preferably an expansion material such as wax. The matrix material 22 is pressed via the first channel opening 5 through the first fiber unit 11 into the second fiber unit 13. As a result, the two fiber units 11, 13 are embedded into the matrix material 22. Moreover, it is possible to fill the channel 4 with the matrix material 22 without the second fiber unit 13 having been situated therein in advance. Due to the filling material 25, it is ensured that the matrix material 22 only enters the channel 4, and not the supply channel 24 itself. After the matrix material 22 has cured, the filling material 25 is flushed out of the supply channel 24. As a result, the supply channel 24 retains its advantageous effect, namely that the mold core 1 can be rapidly flushed out via the supply channel 24.

Figure 8:
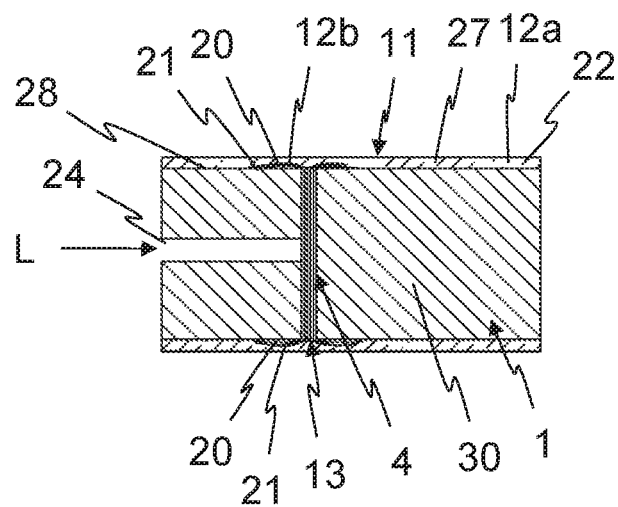
FIG. 8 shows a sectional view of a structural component comprising a mold core.

FIG. 8 shows the two fiber units 11, 13 embedded into the matrix material 22 after the matrix material 22 has cured. The mold core 1 is still situated so as to be surrounded by the fiber unit 11 and the matrix material 22. The connection areas 21 are formed on an inner side 27 of the first fiber unit 11 in this case. The second fiber unit 13 is introduced into the channel 4 before the first fiber unit 11 is wrapped or placed around the mold core 1. The overhanging ends 20 of the fibers 12b of the second fiber unit 13 are folded onto a circumference 28 of the mold core 1.

A solvent L is flushed into the supply channel 24 in order to remove the mold core 1 for forming the hollow structural component 2. The soluble mold core 1, in particular its soluble binding agent, detaches from the structural component 2 as a result. The first fiber unit 11 embedded into the matrix material 22 therefore forms a component wall 19 of the hollow structural component 2. The second fiber unit 13 embedded into the matrix material 22 forms a reinforcing element, in particular a reinforcing strut 26 (cf. FIGS. 9a, 9b). The solvent L can also be flushed onto a cross-section 30 of the mold core 1.

Figures 9A, 9B:
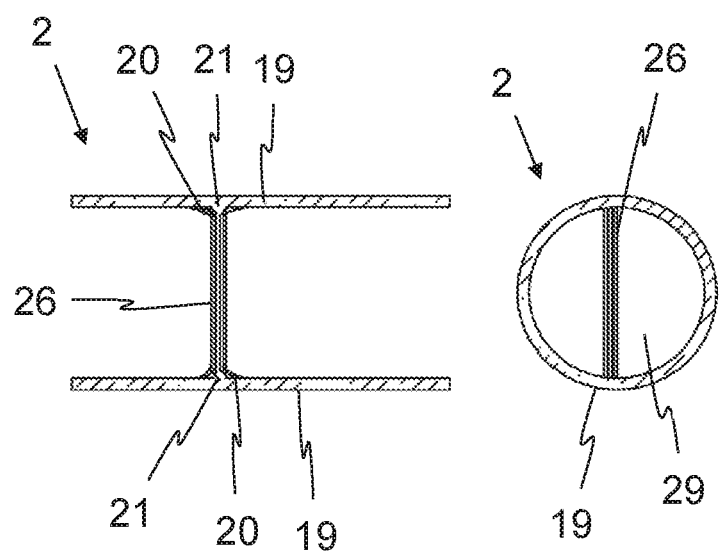

FIGS. 9a and 9b show different views of the hollow structural component 2 formed according to the described manufacturing method. The hollow structural component 2 comprises the component wall 19. The component wall 19 delimits a component cavity 29. The reinforcing element, in particular the reinforcing strut 26, extends through the component cavity 29. The reinforcing element, in particular the reinforcing strut 26, is connected at its two ends 20 to the component wall 19 via the particular assigned connection area 21.

The present invention is not limited to the exemplary embodiments which have been represented and described. Modifications within the scope of the claims are also possible, as is any combination of the features, even if they are represented and described in different exemplary embodiments.

LIST OF REFERENCE NUMERALS 1 mold core
2 hollow structural component
3 volume
4 channel
5 first channel opening
6 second channel opening
7 first mold core part 8 second mold core part
9 first longitudinal section half
10 second longitudinal section half
11 first fiber unit
12a fiber of the first fiber unit
12b fiber of the second fiber unit
13 second fiber unit
14 needle
15 tip
16 eye
17 outer side
18 molding tool
19 component wall
20 ends
21 connection area
22 matrix material
23 negative mold
24 supply channel
25 filling material
26 reinforcing strut
27 inner side
28 circumference
29 component cavity
30 cross-section
31 introduction device
L solvent

The invention claimed is:

1. A method for manufacturing a fiber-reinforced hollow structural component comprising the steps of:
   manufacturing a mold core by rapid prototyping, the mold core including a granular material and a binding agent;
   introducing the mold core and a first fiber unit into a molding tool so that the first fiber unit is distributed at least partially around the mold core and is located between the mold core and the molding tool, the molding tool defining a first supply channel extending from an outside of the molding tool core to an inside of the molding tool;
   injecting a matrix material into the mold core via the first supply channel to at least partially form a component wall from the first fiber unit and the matrix material between the mold core and the molding tool;
   curing the matrix material after the introducing the mold core and a first fiber unit step and the injecting a matrix material step as a result of a change in at least one of a temperature and a pressure to form the hollow structural component;
   flushing the mold core out of the hollow structural component after the curing step to form a component cavity;
   forming at least one channel extending through the mold core during the step of manufacturing the mold core, the at least one channel having a channel opening at each end of the at least one channel; and
   introducing a second fiber unit through at least one of the channel openings into the at least one channel before the curing step, the first supply channel located within the molding tool so that the matrix material exiting the first supply channel is directed into the at least one channel during the injecting step so that, after the injecting, the curing, and the flushing out steps, a reinforcing element is formed from the second fiber unit and the matrix material, the reinforcing element extending through the component cavity and being connected in the area of its two ends to the component wall;
   wherein the first supply channel has a downstream end located in the molding tool so at to direct the matrix material into the at least one channel, the downstream end being located adjacent at least one of the channel openings so that the matrix material exits the downstream end and flows through the first fiber unit and into the at least one channel.

2. The method as claimed claim 1, wherein during the manufacturing step a second supply channel is formed in the mold core for supplying a solvent during the flushing step.

3. The method as claimed in claim 2, wherein the second supply channel is filled, before the injecting step, with a filling material and, after the curing step, the filling material is flushed out together with the mold core in the flushing step.

4. The method as claimed in claim 2, wherein during the flushing step, the solvent is flushed at least one of into the second supply channel and onto a cross-section of the mold core, so that the mold core detaches from the hollow structural component.

5. The method as claimed in claim 2, wherein the mold core expands when the temperature increases, so that the first fiber unit and the matrix material are pressed outward against a negative mold of the molding tool.

6. The method as claimed in claim 1, wherein at least one of the first fiber unit is wrapped around the mold core, the wrapped mold core is introduced into the molding tool and the matrix material is injected into the molding tool after the molding tool has been closed.

7. The method as claimed in claim 1, wherein the at least one channel defines at least two undercuts which are spaced apart in a longitudinal direction of the at least one channel.

8. The method as claimed in claim 1, wherein fibers of the second fiber unit are introduced into the at least one channel with the aid of an introduction device.

9. The method as claimed in claim 1, wherein the second fiber unit is connected, at its two ends, to a particular assigned area of the first fiber unit thereby forming two connection areas.

10. The method as claimed in claim 9, wherein at least one of the two connection areas is formed on an outer side of the first fiber unit, wherein a slot is cut into the first fiber unit and the second fiber unit is guided through the slot.

11. The method as claimed in claim 9, wherein at least one of the two connection areas is formed on an inner side of the first fiber unit, wherein the second fiber unit is introduced into the channel first, an overhanging end of the second fiber unit is folded onto a circumference of the mold core, and subsequently, the mold core is wrapped with the first fiber unit.

12. The method as claimed in claim 9, wherein at least one of the two connection areas is formed in an interior of the first fiber unit.

13. The method as claimed in claim 9, wherein the introduction device includes a needle, and wherein the second fiber unit is pierced with the needle through the first fiber unit lying around the mold core.

14. The method as claimed in claim 9, wherein an overhanging one of the ends of the second fiber unit is at least one of folded onto and sewn together with an outer side of the first fiber unit.

15. A method for manufacturing a fiber-reinforced hollow structural component comprising the steps of:
   manufacturing a mold core by rapid prototyping, the mold core including a granular material and a binding agent;
   introducing the mold core and a first fiber unit into a molding tool so that the first fiber unit is distributed at least partially around the mold core and is located between the mold core and the molding tool, the molding tool defining a first supply channel extending from an outside of the molding tool core to an inside of the molding tool;

injecting a matrix material into the mold core via the first supply channel to at least partially form a component wall from the first fiber unit and the matrix material between the mold core and the molding tool;

curing the matrix material after the introducing the mold core and a first fiber unit step and the injecting a matrix material step as a result of a change in at least one of a temperature and a pressure to form the hollow structural component;

flushing the mold core out of the hollow structural component after the curing step to form a component cavity;

forming at least one channel extending through the mold core during the step of manufacturing the mold core, the at least one channel having a channel opening at each end of the at least one channel; and introducing a second fiber unit through at least one of the channel openings into the at least one channel before the curing step, the first supply channel located within the molding tool so that the matrix material exiting the first supply channel is directed into the at least one channel during the injecting step so that, after the injecting, the curing, and the flushing out steps, a reinforcing element is formed from the second fiber unit and the matrix material, the reinforcing element extending through the component cavity and being connected in the area of its two ends to the component wall;

wherein during the manufacturing step a second supply channel is formed in the mold core for supplying a solvent during the flushing step;

wherein the first supply channel has a downstream end located in the molding tool so at to direct the matrix material into the at least one channel, the downstream end being located adjacent an entrance of the second supply channel so that the matrix material exits the downstream end and flows through the second supply channel and into the at least one channel between the two channel openings of the at least one channel.

16. A method for manufacturing a fiber-reinforced hollow structural component comprising the steps of:

manufacturing a mold core by rapid prototyping, the mold core including a granular material and a binding agent, the manufacturing step including forming a supply channel in the mold core and filling the supply channel with a filling material;

introducing the mold core and a first fiber unit with a matrix material into a molding tool so that the first fiber unit is located between the mold core and the molding tool to at least partially form a component wall;

curing the matrix material after the introducing the mold core and a first fiber unit with a matrix material step as a result of a change in at least one of a temperature and a pressure to form the hollow structural component;

flushing the mold core and the filling material out of the hollow structural component using a solvent after the curing step to form a component cavity;

forming at least one channel extending through the mold core during the step of manufacturing the mold core; and introducing a second fiber unit and the matrix material into the channel before the curing step so that, after the curing and flushing out steps, a reinforcing element is formed from the second fiber unit and the matrix material, the reinforcing element extending through the component cavity and being connected in the area of its two ends to the component wall.

\* \* \* \* \*